US009128978B2

(12) United States Patent
Meyer et al.

(10) Patent No.: US 9,128,978 B2
(45) Date of Patent: Sep. 8, 2015

(54) METHOD OF IDENTIFYING AND SELECTING EVENTS

(75) Inventors: Christopher Meyer, Los Gatos, CA (US); David Rich, Ashland, MA (US); Anjali Chawla, Foster City, CA (US)

(73) Assignee: PROJECT: WORLDWIDE, INC., Troy, MI (US)

( * ) Notice: Subject to any disclaimer, the term of this patent is extended or adjusted under 35 U.S.C. 154(b) by 642 days.

(21) Appl. No.: 12/463,857

(22) Filed: May 11, 2009

(65) Prior Publication Data

US 2009/0282051 A1 Nov. 12, 2009

Related U.S. Application Data

(60) Provisional application No. 61/051,984, filed on May 9, 2008.

(51) Int. Cl.
G06Q 30/02 (2012.01)
G06F 17/30 (2006.01)

(52) U.S. Cl.
CPC .......... G06F 17/30386 (2013.01); G06Q 30/02 (2013.01)

(58) Field of Classification Search
USPC ......................................... 707/688; 705/7.29
See application file for complete search history.

(56) References Cited

U.S. PATENT DOCUMENTS

| 7,933,926 B2* | 4/2011 | Ebert ............................ 707/793 |
| 2003/0200192 A1* | 10/2003 | Bell et al. .......................... 707/1 |
| 2003/0225762 A1* | 12/2003 | Kolberg et al. .................... 707/7 |
| 2005/0071217 A1* | 3/2005 | Hoogs et al. ..................... 705/10 |
| 2007/0233708 A1* | 10/2007 | Baio et al. ...................... 707/100 |
| 2007/0265908 A1* | 11/2007 | Berkman et al. ................. 705/11 |
| 2008/0015920 A1* | 1/2008 | Fawls et al. ....................... 705/8 |
| 2008/0140505 A1* | 6/2008 | Romano et al. .................. 705/10 |
| 2008/0154696 A1* | 6/2008 | Spiegelman et al. ............ 705/10 |
| 2008/0294502 A1* | 11/2008 | Broome .......................... 705/10 |
| 2011/0153340 A1* | 6/2011 | Romano et al. ................. 705/1.1 |
| 2013/0231982 A1* | 9/2013 | Berkman et al. .............. 705/7.39 |

* cited by examiner

Primary Examiner — Sherief Badawi
Assistant Examiner — Christopher J Raab
(74) Attorney, Agent, or Firm — Gifford, Krass, Sprinkle, Anderson & Citkowski, P.C.

(57) ABSTRACT

An embodiment for method for identifying and selecting events and routing them into the marketing mix, creating event marketing and marketing portfolios. In the method, events may be extracted from a database of events. The extracted events may then be passed through one or more manual or automatic data filters to identify one or more events that correspond to a predetermined goal of an enterprise (e.g., increase sales, increased product recognition, etc). Information concerning the corresponding events may then be provided in the form of a report.

18 Claims, 3 Drawing Sheets

METHOD OF IDENTIFYING AND SELECTING EVENTS

CROSS-REFERENCE TO RELATED APPLICATIONS

The present application claims priority from U.S. Provisional Application No. 61/051,984 filed May 9, 2008.

FIELD OF THE INVENTION

Disclosed is an embodiment of a method for identifying and selecting events and routing them into the marketing mix, creating event marketing and marketing portfolios. In the method, events may be extracted from a database of events. The extracted events may then be passed through one or more manual or automatic data filters to identify one or more events that correspond to a predetermined goal of an enterprise (e.g., increase sales, increased product recognition, etc). Information concerning the corresponding events may then be provided in the form of detailed reports.

BACKGROUND OF THE INVENTION

A business should have a clear understanding of its operating environment, which may result from a careful analysis of a number of factors. One factor is knowledge of competitors. Another involves having a grasp on the business' own marketing. The ability to tie together particular events, with relevant products or services, and with the business' core message, and then effectively relay that information to a target audience is invaluable in the modern marketplace. However, too often a business' attempt to juggle so many factors at the same time can result in dropped balls—an ineffective event, a poorly articulated message, or even presenting wrong products to the right audience.

Therefore, it would be advantageous to have a computer based system that may operate to assist in identifying and selecting events that are appropriate for a particular business operation and that may generate reports concerning same. More specifically, it would be advantageous to have a computer based process in which users may access detailed campaign strategies, outline IMC objectives, key competitors, audience careabouts, and event strategies and obtain in-depth event summaries provide detailed audience profiles, event content, and an analysis of the competitive landscape.

SUMMARY OF THE INVENTION

The present application claims priority from U.S. Provisional Application No. 61/051,984 filed May 9, 2008, the disclosure of which is incorporated by reference herein in its entirety.

One embodiment of a method for identifying and selecting marketing events may be directed to global, web-based, enterprise-class applications that integrate, automate, standardize and streamline the event marketing portfolio planning and management process by providing an organization with end-to-end visibility on cutting-edge, real-time, information around events, the organization's engagement at events, and the organization's competitors/partners/customers presence at events. Use of the disclosed method may enable organizations to: 1) Practice fact-based decision making; 2) Refine event portfolio mix continuously; 3) Create persuasive brand experiences; 4) Improve audience quality, attendance and reach; 5) Provide a program-wide event marketing toolkit; and 6) Ensure best use of available human resources. As a result, an organization may experience benefits such as 1) Increased alignment to business and marketing objectives; 2) Seamless integration across marketing mix and event tactics; and 3) Evolution from event management to event marketing.

One non-limiting embodiment of a method of identifying and selecting marketing events may comprise a step of providing a computer, such as a networked web-server, that is accessible by a plurality of remote users and includes a processor and a memory module. The memory module may include a computer-readable storage medium and a database that may be stored on the computer-readable storage medium. The database may be accessible by the plurality of remote users, and it may be partitioned or otherwise set up to include at least a first data set (such as a universal or $3^{rd}$ party event database) a second data set (such as a proprietary event database), and (as described infra) a third, fourth and fifth data set). Each of the first and second data sets may include a plurality of event records that contain categories of information pertaining to particular events (i.e., trade shows, municipal or civic events, internal corporate events, etc). Moreover, access to the first data set may be open or reasonably unrestricted while access to the second data set may be restricted only to particular users.

In another step, all or a lesser number of the event records from at least one of the first or second data sets, or a combination of the two, may be transferred into a third data set—which may also be identified as a draft portfolio. This third data set may be located on the computer-readable computer-readable storage medium, and partitioned into the database.

In another step, all or a lesser number of the event records from the third data set may be transferred into a fourth data set—which may also be identified as a recommended portfolio. This fourth data set may be located on the computer-readable computer-readable storage medium and partitioned into the database.

In another step, an objectives data set—which may consist of information that is relevant to a particular user—may be generated on the computer-readable storage medium following the transfer of event records into the fourth data set. Each objectives data set may be associated with each event record such that the user may better understand how a particular event relates to the user's business operations and/or goals.

In another step, all or a lesser number of the event records from the fourth data set (including any associated objectives data sets) may be transferred into a fifth data set—which may also be called a final portfolio. This fifth data set may also be located on the computer-readable computer-readable storage medium and partitioned into the database.

In another step, one or more reports may be generated that include information corresponding to selected records in the fifth data set or, alternative, information corresponding to selected records in the first, second, third, fourth or fifth data sets or any combination thereof.

BRIEF DESCRIPTION OF THE DRAWINGS

Reference will now be had to the drawing wherein like reference numerals refer to like parts throughout and wherein.

DETAILED DESCRIPTION OF THE PREFERRED EMBODIMENTS

Figure 1:
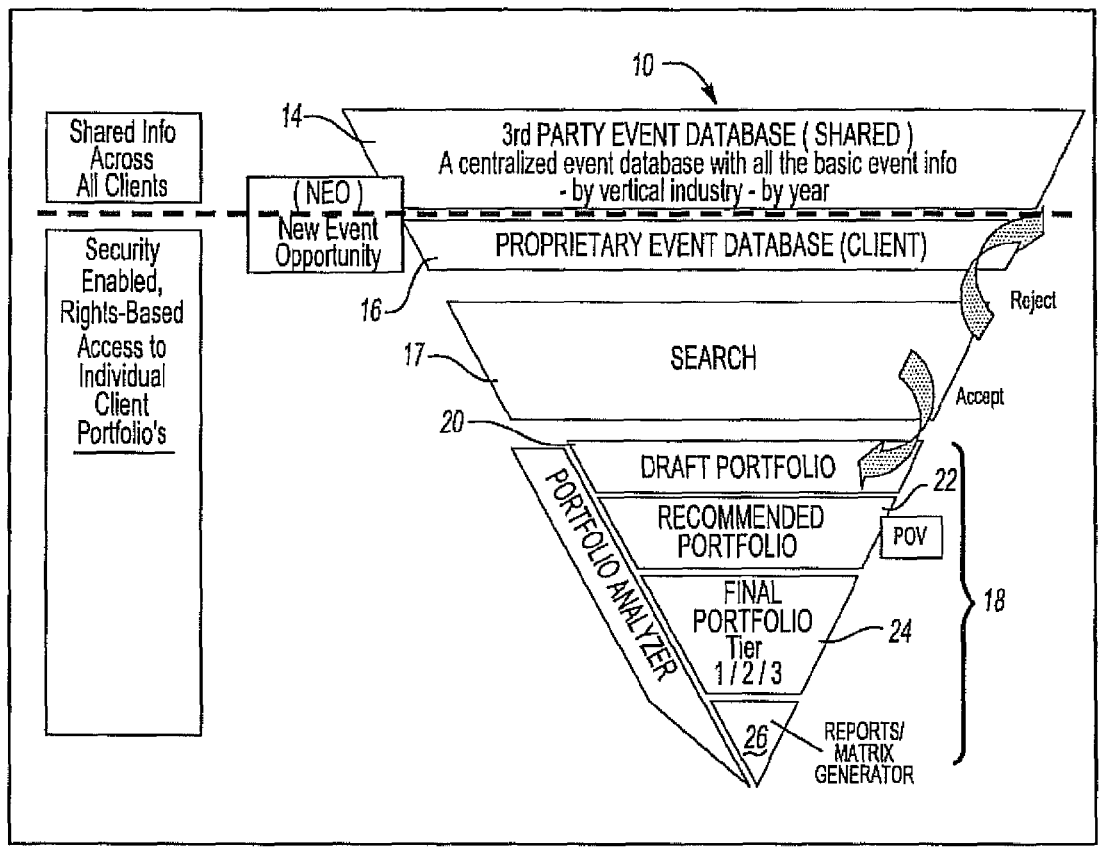
FIG. 1 is a diagrammatic view of an embodiment of the method for identifying and selecting events.
Figure 2:
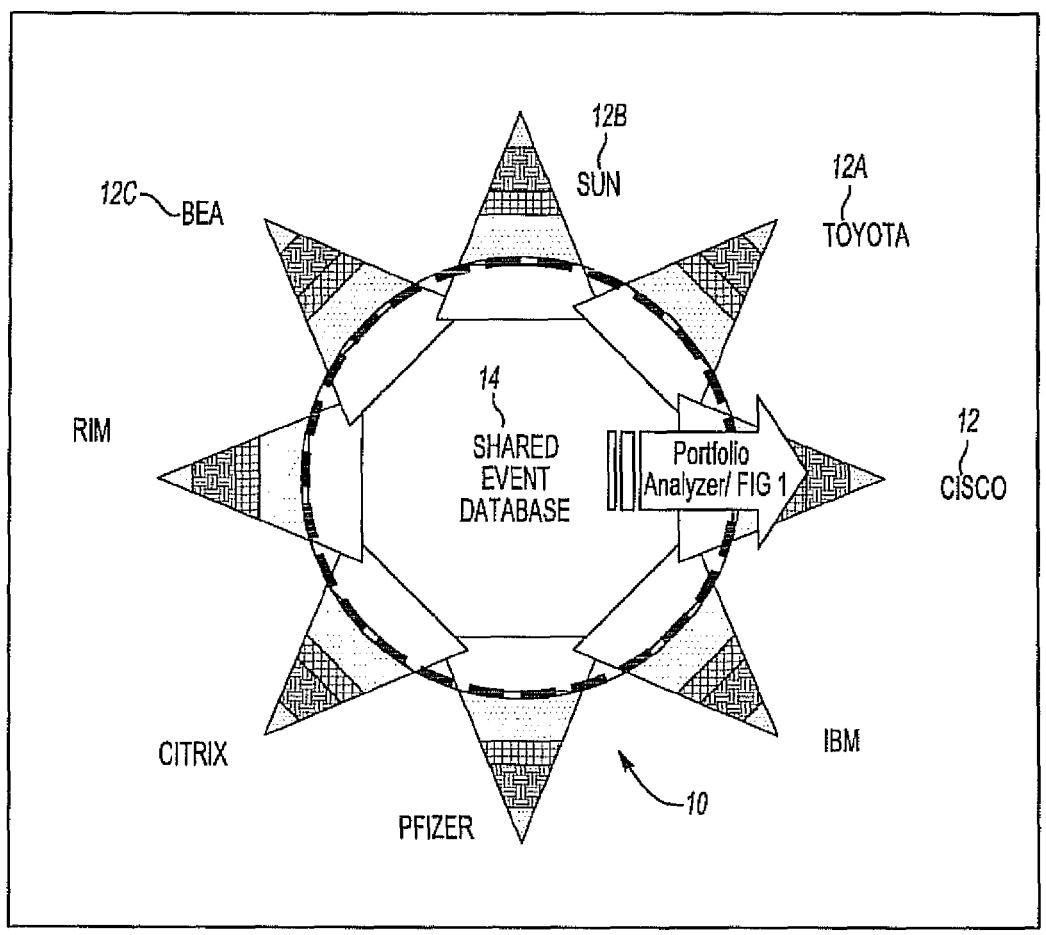
FIG. 2 is a diagrammatic view of an embodiment of the method for identifying and selecting events indicating a shared $3^{rd}$ party event database utilized by a plurality of enterprises to identify and select events.
Figure 3:
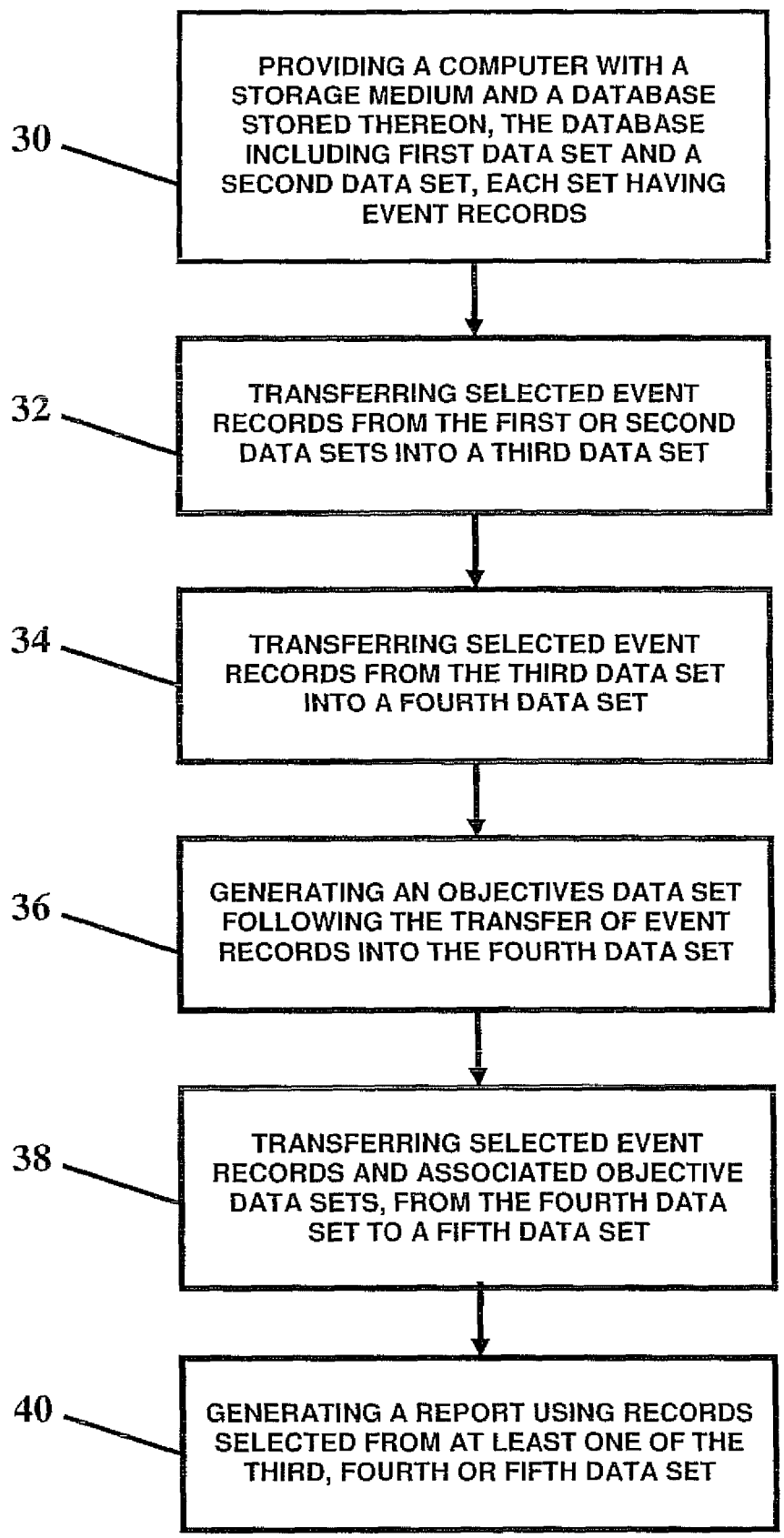
FIG. 3 is a flowchart view of an embodiment of the method for identifying and selecting events.

Referring now to FIGS. 1 through 3, disclosed is a method or process 10 for identifying and selecting events that may be relevant to a predetermined marketing and/or sales objective of an enterprise 12 or a business unit of the enterprise. One step 30 of the embodiment of the method 10, may include a universal or $3^{rd}$ party event database 14 (i.e., a first data set) on a computer server that contains a plurality of event records (not shown), with each event record including information relating a particular event. As shown in FIG. 2, the $3^{rd}$ party event database 14 may be accessed by one or more unrelated enterprises 12, 12a, 12b, 12c, etc. Access to the database 14 may also be restricted according to criteria established by a system administrator.

Event records cataloged within the $3^{rd}$ party event database 14 that are generally relevant to the objectives of a particular enterprise 12 may, in another next step, be identified and placed into or otherwise associated with a proprietary event database 16 (i.e., a second data set). In addition to records extracted from $3^{rd}$ party event database 14, the proprietary event database 16 may also include internal events offered by an enterprise 12 for itself, its customers and/or its vendors that are not listed in the $3^{rd}$ party event database 14. It will also be appreciated that access to the proprietary event database 16 may be necessarily be restricted to a particular enterprise (group of enterprises or enterprises within a particular industry).

Still referring to FIGS. 1 through 3, the databases 14, 16 may be resident on a computer server (not shown), or on two or more servers that are networked together (not shown). The server(s) may be accessed directly, or may be accessed remotely using standard telecommunications tools and devices. The databases 14, 16 may be internet/web based such that the databases (and in fact the entire system) may be easily maintained, displayed and reviewed, and so that each may be part of a single database system, with each database 14, 16 merely being a separate feature or partition on that single database system.

Still referring to FIGS. 1 through 3 (and as will be described infra), event records placed into a proprietary event database 16 (and/or the database 14) may be further screened and/or filtered to identify events that may have specific relevance to the objectives of a business unit or campaign of the enterprise 12. For example, when one or more event records are identified as having potentially greater relevance to the objectives of the enterprise (based upon the event's relevance to portfolio target data, discussed infra), those records may be further filtered through a portfolio analysis 18/portfolio analyzer that may include at least the following process:

1) the step 32 of placing of event records into a third data set or draft portfolio 20 (i.e., a collection of events records) having a collection of event records filtered from the $3^{rd}$ party event database 14, the proprietary event database 16, or a combination of both databases 14, 16;

2) the step 34 of placing event records from the third data set into a fourth data set or recommended portfolio 22 having a collection of event records filtered from the draft portfolio 20; and 3) the step 38 of placing event records from a fourth data set into a fifth data set or final portfolio 24 having a collection of event records filtered from the recommended portfolio 22, approved by the enterprise, and representing a final agenda of future events that will be engaged by and reported to 26 the enterprise 12.

Referring now to FIG. 3, an event associated with an event record may include any manner of public or private event that may allow for the marketing, promotion or sale of a product or service of an enterprise 12. Such events may include sporting events, concerts, tradeshows, conferences, or the like. The events may also be broadly categorized as being at least one of: a Tradeshow/Conference—Third Party; a Tradeshow/Conference—Proprietary; a Road Show—Third Party; a Road Show—Proprietary; an Online event—Third Party; an Online event—Proprietary. However, it will be appreciated that given the wide spectrum of possible events, the events may be categorized in a number of ways.

Referring to FIG. 1, each event record in the $3^{rd}$ party event database 14 may include sub-categories of information specific to each event, including:

General; this category may include Date Information, Venue Information, and Event Details for a particular event.

Producer; this category may include Event Producer Information, Primary Contact, Marketing Contact, Conference Contact, Exhibit & Sponsorship Sales Contact and Press Contact Information for a particular event.

Marketing; this category may include Third Party Audit Information, Audience Information, Audience Generation Plan and Pre-Qualification Process Details for a particular event.

Audience; this category may include Audience Demographics for a particular event. The demographic data may also be further sub-categorized to include but not be limited to: Audience Type, Attendee Title, Vertical Industry, Geography, Job Function, Company Size and Buying Power. Additional data such as psychographic or behavioral data in relation to the audience may also be included.

Keynote; this category may include and list of the Keynote Speakers and Keynote details for a particular event.

Conference; this category may include the Conference Theme, Track(s) Information and Session(s) Information for a particular event.

Speaking; this category may include Call for Papers Information for a particular event.

Exhibit; this category may include Exhibit Hall Statistics, Product/Solution Categories and Zones on Show Floor information for a particular event.

Exhibiting; this category may include Pricing information including, Booth Price, Booth Turnkey Packages, Meeting Room Price, Meeting Room Turnkey Packages and Zone Pricing information for a particular event.

Sponsorship; this category may include Sponsorship Package(s) information for a particular event.

MPOs; this category may include MPO (Marketing Promotional Opportunities) Package(s) information.

AR/PR (analyst relations/press relations); this category may include AR/PR Attendance, AR/PR Coverage and AR/PR Events information for a particular event.

AR/PR Ops; this category may include Press Sponsorship Package(s) information for a particular event.

Attachments; this category may include attached required documents. These attachments may be are separated by section, and may include an Event Brochure, Third Party Audit, Attendee List, Speaking Opportunities, Exhibitor List, Exhibit Hall, Exhibiting Opportunities, Sponsorship Opportunities, Marketing Promotional Opportunities, Press Information, Analyst Information and Other Attachments for a particular event.

Notes; this category may include private notes for a particular event.

Performance; information on the projected performance and/or actual performance of an event may be associated with each event record, which may be sorted or reported as a component of the various steps outlined infra.

Additional categories of information may also be created, and each of the above categories may be edited and subcategories created, modified and or deleted, by a global database administrator.

Still referring to FIG. 1, as mentioned supra, an initial list of potentially desirable events may be identified by a search 17 (i.e. an opportunity evaluation) of the $3^{rd}$ party event database 14 using a predetermined set of search criteria. For example, one embodiment of the method may include a "Basic Search" in which search criteria or parameters may include the Event Name, the Event Year, the Anticipated Month, the Event Type, the Event Country, the Event State, and the Event City. It may also be desirable to permit keyword searches of specific categories of data in each event including, for example, the Event Description, the Event Producers Value Proposition, Conference Content and others. A basic search may be accomplished as a manual function, with a user selecting the specific search criteria, or as an automatic function using data generally relevant to a particular enterprise or the industry to which the enterprise is part. For example, if an enterprise is part of the steel industry, the search may automatically search and identify relevant event records based upon predetermined keywords (or fuzzy logic operations) that are generally relevant to that industry (e.g., the keywords steel and metal might automatically identify conferences relating to steel, meetings of metallurgical organizations, etc.)

The search 17 (opportunity evaluator) may also comprise an "Advanced Search" function. Relevant event records may be identified based upon their relevance to a set of weighted search criteria—i.e. a percent weight according to the predetermined objectives of the enterprise. This weighted system may be internal to each parameter—for example a sample search may involve the following factors with each factor being weighted as indicated: Event Country—USA—50%; EU—25%; Australia 15%; Singapore 10%. The factors may also be weighted to highlight multiple parameters such as: Event Type—Road Show, $3^{rd}$ Party—60%; Event Country—USA—40%. It will also be appreciated that the advanced search function may be manual operation of the user, or an automatic operation of the system based upon predetermined weights for factors that are generally relevant to a particular industry. For example, a particular industry may universally consider the USA to a key market that must be strongly weighted—yielding an automatic search like the following: Industry—Steel; Event Country—USA—80%; EU—10%; Australia 5%; Singapore 5%

Still referring to FIG. 1, and again as mentioned supra, the search step 17 may also include identification of relevant event records using enterprise specific target information that may be matched against event records in the databases 14, 16. For example, event records in the event database 14 that match enterprise specific target portfolio criteria may get "attached" (manually or automatically) to the enterprise specific proprietary event database 16. Once in the proprietary event database 16, additional enterprise specific care-abouts may be added to each event record. Thereafter, event records may be filtered and further refined through the draft 20, recommended 22 and final 24 portfolios. Examples of relevant data sub-categories of enterprise specific target information may include:

General; This section may display six corporate levels of association for a portfolio, along with budget information. The six corporate levels of information have been pre-configured and customized for each Enterprise and may, for example, include a drop down list of Geo, Regions, Countries, Market Segments, Business Units, and Marketing Campaigns.

Contact Information; This section may display contact information for key stakeholders for each portfolio.

Marketing; This section may display the sales conversion cycle, along with ability to associate specific percentages with each, Marketing objectives, their descriptions and the ability to associate which corporate objectives (pre-configured) each marketing objective maps back to and financial goals.

Framework; This framework may display a framework picture showing a snapshot of target markets (and target weight associated with each); key solutions and their relevance to each target market; along with a description about the Business Unit alignment.

Target Market; This section may allow a user to assign target percentages to corporate level (pre-configured) & portfolio level market segment information.

Target Industry; This section may allow a user to assign target percentages to corporate level (pre-configured) & portfolio level vertical industry information.

Audience Overview; This section may allow a user to view the overview of the audience and assign target percentages to both corporate (pre-configured) & portfolio level target audience segment information.

Product Solutions; This section may allow a user to add product solution types and comments on each product type.

Routes to Market; This section may include the following sub-sections a) Key Programs, b) Internal Leverage, and c) Key Launches & allows a user to add multiple items within each sub-section.

Key Players; This section may include both competitor as well as partner specific information and may allow a user to add situational analysis, swot analysis, key product information, key players details and categories for each key player.

Event Objective/Strategies/Tactics; This section may display the event objectives descriptions, strategy recommendations and tactical recommendations. Event objectives are mapped back to corporative objectives. Multiple strategy recommendations may be added for each event objective and multiple tactical recommendations may be added for each strategy recommendation, all of which may be prepared by reference to and analysis of the other categories of information set forth above.

Additional sub-categories of information may also be created, and each of the above sub-categories may be edited and secondary subcategories created, modified and or deleted. In addition, it will be appreciated that target data may also be relevant to two or more enterprises or to an entire industry. Therefore, event records may be automatically attached to a proprietary event database using criteria that is predetermined to be relevant to the industry of a particular enterprise.

Still referring to FIG. 1, as a function of the search 17, event records in the $3^{rd}$ party event database 18 and the proprietary event database 16 may be associated with a draft portfolio 20. As mentioned supra, the search and association of events may again be accomplished as a manual function, with the user selecting the specific search criteria, or as an automatic function based upon the weighted relevance of the event data to the target data in the portfolio. As a manual function, this step may be carried out similar to the function of adding items to a virtual shopping cart on a commercial website.

Still referring to FIG. 1, event records in the draft portfolio 20 may be further reviewed, refined and then associated with a recommended portfolio 22. This association of event records into the recommended portfolio 22 may be accomplished as a manual function, with the user selecting specific events that best align to target data in the portfolio and moving, transmitting, transferring or otherwise remitting the records over to the Recommended portfolio, or as an automatic function with the system using a further set of weighted criteria or predetermined relevant keywords.

The act of moving an event(s) record to a recommended portfolio 22 may automatically result in the step 36 of the generation by die system of a "point of view" page or objective data set that can allow a user to create a statement explaining how a particular event specifically relates to the objectives outlined within an enterprises portfolio as they pertain to either the enterprise as a whole, and/or to a business unit within the enterprise based upon a set of predetermined alignment criteria. Examples of "point of view"/alignment criteria/ objective data sets include: 1) Alignment to Event Marketing Objectives; 2) Analyst/Press Relations; 3) Customer Presence; 4) Engagement Opportunities; 5) Event Content; 6) Industry Prominence; 7) Right Audience; 8) Share of Voice; 9) Speaking Opportunities, and others. However, it will be appreciated that additional or different alignment criteria may be used or developed according to the needs of the enterprise. Each point of view has a "POV Status" which includes: 1) Recommended by Reviewer; 2) Recommended by Client; 3) Considering; 4) Planned; 5) Completed; 5) Rejected—Not a Priority 6) Rejected—Not a Fit. The POV status in the draft portfolio may default to "Recommended," status, but may be changed continuously, depending on where an enterprise is in the decision making process with regards to their potential engagement at an event.

Still referring to FIG. 1, a further review of the point of view statements and the other event data may result in the identification of highly relevant events from the recommend portfolio 22 that may be associated with a fifth data set—the actual/final portfolio 24 for the enterprise. Events associated with the actual portfolio 24 are those that the enterprise actually intends to attend. Events in the actual portfolio may be further segmented into Tier 1 (most preferred events) to Tier 3 (lesser preferred events). This association of event records into the actual portfolio 24 may be accomplished as a manual function, with the user changing the POV status for a specific event within a specific portfolio to "Planned." Alternatively, the association may be accomplished as a manual function using, for example, methods described above such as predetermined keywords for an industry or weighted functions.

Referring to FIGS. 1 and 3, in another step 40 event records associated with the actual or final portfolio 24 (and alternatively the recommended portfolio 22 or draft portfolio 20) may be reported to an enterprise using a selection of reporting criteria. One example of relevant reporting criteria may include permitting reporting matrix 26 of events based upon the six corporate levels of information (i.e., Geo, Regions, Countries, Market Segments, Business Units, and Campaigns) in a matrixed view. This reporting matrix may hold three key levels of information: 1) Event information (running down the left hand side); 2) Portfolio information (along the top); 3) POV information (at each point of intersection of 1 & 2 above).

Having thus described my invention, various other embodiments will become known to those who are skilled in the art that do not depart from the scope of the present invention.

The invention claimed is:

1. A method for identifying and selecting events and generating a report comprising:
providing a computer accessible by a plurality of remote users and including a processor and a memory module and with the memory module comprising a computer-readable storage medium, a database stored on the computer-readable storage medium, with the database being accessible by the plurality of remote users and including a first data set and a second data set, the first and second data sets each comprising a plurality of event records, the first data set event records including records identifying events offered by a third party and the second data set event records including records identifying proprietary events offered by a predetermined remote user, with each event record including categories of information;
transferring at least one selected event record identifying a third party event from said first data set and at least one event record identifying a proprietary event from said second data set into a third data set based upon a percent weight correspondence to one of the predetermined categories of information, and the percent weight being assigned to each predetermined categories of information being based upon the predetermined objectives of the predetermined remote user, the third data set being stored on the computer-readable storage medium;
transferring selected event records from the third data set to a fourth data set, the fourth data set being stored on the computer-readable storage medium;
generating an objectives data set on the computer-readable storage medium following the transfer of event records into the fourth data set, with each objectives data set being associated with an event record;
transferring selected event records, along with each event record's associated objective data set, from the fourth data set to a fifth data set, the fifth data set being stored on the computer-readable storage medium;
generating a report including information corresponding to selected records in the fifth data set.

2. The method of claim 1, wherein the categories of information comprise at least one of general, producer, marketing, audience, keynote, education, speaking, exhibit, exhibiting, sponsorship, marketing promotional opportunities, AR/PR, attachments or note information.

3. The method of claim 1, wherein the selected event records transferred to the third data set are selected based upon correspondence to target criteria of the predetermined remote user.

4. The method of claim 3, wherein the target criteria comprises at least one of a general, contact, marketing objectives, BU framework, target market, target industry, audience overview, product solution, routes to market, key player, and organization of interest type of information.

5. The method of claim 3, wherein the selected event records transferred to the third data set are selected based upon a percent weighted correspondence to target criteria of at least two of the predetermined remote users.

6. The method of claim 1, wherein the objectives data set comprises categories of data that include at least one of an alignment to event market objectives, analyst/press relations, customer presence, engagement opportunities, event content, industry prominence, right audience, or share of voice and speaking opportunity data.

7. The method of claim 1, wherein the number of event records transferred into the third data set from the first or second data set is equal to or less than the number of event records in the first data set.

8. The method of claim 1, wherein the number of event records transferred from the third data set to the fourth data set is equal to or less than the number of event records in the third data set.

9. The method of claim 1, wherein the number of event records transferred from the fourth data set to the fifth data set is less than the number of event records in the fourth data set.

10. The method of claim 1, wherein each event record corresponds to at least one of a public event or a private event.

11. The method of claim 1, wherein each event record corresponds to at least one of a real event or a virtual event.

12. The method of claim 1, wherein each event record corresponds to an organized future activity selected from a group consisting of a sporting event, a concert, a tradeshow and a conference.

13. The method of claim 1, wherein the first data set comprises event records for events wherein each event is hosted by at least one of a plurality of different organizations, and the second data set comprises event records for events where each event is hosted at least in part by the same organization.

14. The method of claim 1, wherein said predetermined remote user includes one of an enterprise or a business unit of said enterprise.

15. A method for identifying and selecting events and generating a report comprising:
  providing a computer accessible by a plurality of remote users and including a processor and a memory module and with the memory module comprising a computer-readable storage medium, a database stored on the computer-readable storage medium, with the database being accessible by the plurality of remote users and including a first data set and a second data set, the first and second data sets each comprising a plurality of event records, the first data set event records including records identifying events offered by a third party and the second data set event records including records identifying proprietary events offered by a predetermined remote user, with each event record including categories of information;
  generating a third data set on the computer-readable storage medium, the third data set comprising at least one event record identifying a third party event and at least one record identifying a proprietary event, the records being automatically selected from each of the first data set and the second data set based upon percent weight correspondence to one of the predetermined categories of information, the percent weight being assigned to each predetermined categories of information being based upon the predetermined objectives of the predetermined remote user;
  and the number of event records in the third data set being less than the number of event records in the first data set;
  generating a fourth data set on the computer-readable storage medium comprising records selected from the third data set;
  generating an objectives data set on the computer-readable storage medium following the transfer of event records into the fourth data set, with each objective data set being associated with an event record;
  generating a fifth data set on the computer-readable storage medium comprising records selected from the fourth data set;
  generating a report including information corresponding to selected records within any data set.

16. The method of claim 15, wherein each event record corresponds to at least one of a public event or a private event.

17. The method of claim 15, wherein each event record corresponds to at least one of a real event or a virtual event.

18. The method of claim 15, wherein each event record corresponds to an organized future activity selected from a group consisting of a sporting event, a concert, a tradeshow and a conference.

* * * * *